Patented Nov. 1, 1938

2,135,450

UNITED STATES PATENT OFFICE 2,135,450

PREPARATION AND RECOVERY OF ALIPHATIC ESTERS

Alfred T. Larson, Wilmington, Del., assignor to E. I. du Pont de Nemours & Company, Wilmington, Del., a corporation of Delaware No Drawing. Application December 13, 1935, Serial No. 54,324

20 Claims. (Cl. 260—496)

This invention relates to a process for the formation of organic compounds and particularly to the preparation of carboxylic acids and esters by the interaction of aliphatic ethers and carbon monoxide in the presence of a condensing agent.

Many processes have been proposed for the preparation of organic acids and their esters by the interaction in the vapor phase of alcohols, ethers or esters with the oxides of carbon. It has been shown that acetic acid and methyl acetate may be prepared in varying proportions by the vapor phase condensation of methanol with carbon monoxide in the presence of a suitable catalyst. Moreover, it has been suggested that aliphatic acids may be prepared from methane and carbon dioxide, from carbon monoxide and water vapor, and from ethers and carbon monoxide. These processes, however, have generally been conducted in the vapor phase at elevated temperatures and under superatmospheric pressures, and have been more or less of an academic nature for the reason that yields are low and operating costs high.

An object of this invention is to provide a process for the preparation of higher molecular weight organic compounds through the introduction of carbon monoxide into lower molecular weight organic compounds. A further object of the invention is to provide a process for the preparation of esters by the condensation of aliphatic ethers with carbon oxides in the presence of condensing agents.

A further object of the invention is to provide a process for the preparation of esters having the structural formula $C_nH_{2n+1}COOC_nH_{2n+1}$, from ethers having the structural formula $(C_nH_{2n+1})_2O$, by subjecting the ethers to the action of carbon monoxide in the presence of a highly active condensing agent. Other objects and advantages of the invention will hereinafter appear.

I have found that organic esters can be prepared by passing carbon monoxide into an addition compound formed between a dialkyl ether and boron trifluoride. As a result of the reaction between these compounds an addition compound, which may likewise be called an organic complex, consisting of an alkyl ester of an aliphatic carboxylic acid and boron trifluoride is formed. This product is subsequently reacted with a dialkyl ether, which appears to free the ester from its complex with the halide, the ether preferentially forming a complex with the halide. The resulting mixture is distilled to remove the free ester and leave as a residue a dialkyl ether-boron trifluoride complex which can again be treated with carbon monoxide to form the ester complex. It will be appreciated, therefore, that the more or less expensive catalyst such as boron trifluoride can be continuously recirculated through the process with substantially no loss and due to the exceedingly high rate of reaction an excellent output per synthesis unit renders this process extremely attractive for the preparation of esters at low cost. Aliphatic acids can be readily prepared from the esters by simple hydrolysis.

The ether-carbon monoxide liquid phase reactions which can be accelerated by the above described process and in a manner which will be more carefully particularized hereinafter may be expressed as follows:

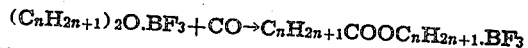

the ester may be readily removed from the ester .$BF_3$ complex by the addition to the reaction mixture of ethers whereupon a rearrangement will occur, the ether preferentially appearing to form the complex thus freeing the ester which may be readily distilled from the resulting mixture, the interchange occurring as illustrated by the formula:

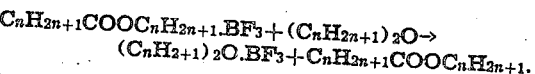

Boron trifluoride forms a complex readily with ethers and particularly the lower aliphatic saturated and unsaturated ethers such as methyl ether, ethyl ether, propyl ether, isopropyl ether, methyl allyl ethers, diallyl ether and the like and consequently such ethers are well adapted for use in this stage of the synthesis.

It will be appreciated that numerous advantages are inherent in conducting this separation stage with an ether and particularly since the ether originally used for the residual complex may be used again without further treatment. Other compounds, however, may be used to free the ester from the complex. It may be generally stated that any compound whether organic or inorganic which forms a complex with the halide, which is stable and from which the free ester may be recovered by distillation, extraction, absorption, or other suitable means may be employed. Such compounds include, of course, the ethers already mentioned, water, metal halides, such as, for example, calcium fluoride, sodium chloride, sodium fluoride, etc., alcohols and more particularly the lower and more stable alcohols in the presence of boron fluorides, viz. methanol, ethanol, propanol, and other organic and inorganic compounds having the above readily determined characteristics.

Other compounds, which contain boron and a halogen and which appear to form similar addition compounds or complexes with the ethers may likewise be employed such, for example, as dihydroxyfluoboric acid, borofluohydric acid, and in general the oxygenated acids obtained from mixtures of hydrofluoric acid, boric acids and borates. Boron fluoride, as well as the other condensing agents, may be used alone or in the presence of promoters, such as, powdered nickel, nickel oxide, mercury oxides or other powdered metals or metal oxides which may be introduced to promote the activity of the condensing agent. Boron fluoride is an excellent condensing agent especially for the conversion of dimethyl ether to methyl acetate, particularly when a low percentage say from 1 to 5% of dihydroxy fluoboric acid or borofluohydric acid is present. Generally, however, I prefer to use boron fluoride alone for it is such a powerful condensing agent that promoters for further extending its condensing ability are not ordinarily necessary.

While I have indicated that boron trifluoride is my preferred condensing agent and boron halogen compounds are generally highly active therefore, nevertheless, for the reaction of some ethers with carbon monoxide, halides of other amphoteric elements or elements whose oxides upon hydrolysis form weak bases and which appear to form complexes with ethers and esters may likewise be employed. Among these condensing agents are included the following anhydrous metal and non-metal halides: titanium chloride, antimony chloride, and the chlorides, bromides, fluorides and iodides of the above metals including boron as well as such halides of aluminum, beryllium, titanium, zirconium, hafnium, thorium, columbium, sulphur, silicon, phosphorus, tantalum, chromium, vanadium and molybdenum.

My preferred condensing agent may be used in various proportions which are governed by the type of ether being treated. In the absence of a promoter the ratio of ether to condensing agent should range generally from 0.1 to 1.0 mol or higher per mol of the ether while in the presence of promoters much lower amounts may be employed. The activating ability of the promoters determines in large measure the amount required, the particular ether as well as temperature and pressure conditions also being taken into consideration.

The synthesis can generally be efficiently carried out under the following operating conditions. Pressure may vary from atmospheric pressures up to 1000 atmospheres or even more. Generally, it appears preferable to operate in the neighborhood of 350 to 750 atmospheres. Temperature within the reaction zone is not particularly critical for, with the highly efficient condensing agents used, the reaction will proceed from room temperatures up to approximately 350° C., practical reaction rates being realized within the range of from 150 to 240° C., under which temperature conditions side reactions are particularly minimized.

The carbon monoxide used may be obtained from various commercial sources, such, for example as water gas, producer gas, coke oven gas, and the like, but to obtain products of the highest degree of purity it is preferable to remove from such commercial gases the objectionable constituents such as sulphur compounds, metal carbonyls, and so forth.

Furthermore, inert gases may be present in the carbon monoxide used and they are, in some instances, desirable. Nitrogen, for instance, has, it appears, little deleterious effect on the reaction or yield and, in fact may be used advantageously in order to aid in the agitation of the ether complex, particularly, if the carbon monoxide is bubbled directly into the ether complex. Other strictly inert gases will usually act similarly to nitrogen.

Not only can methyl ether be condensed in the presence of carbon monoxide and my condensing agent to methyl acetate but the higher ethers such as ethyl ether, propyl ether, butyl ether, diallyl ether, the beta and gamma chlor ethers, cyclohexyl ether, as well as the unsymmetrical ethers, such, for example, as methyl ethyl ether, ethyl propyl ether, methyl propyl ether, methyl allyl ether, anisol and the like may likewise be converted to corresponding esters.

I shall now describe specific embodiments of my process but it will be understood that the details therein given and the compounds employed, either as reactants or as condensing agents in no way restrict the scope of the invention, but merely illustrate methods by which my process can be carried out.

*Example 1.*—46 parts by weight of dry dimethyl ether was passed into a glass vessel simultaneously with the admission of 67.8 parts by weight of dry boron trifluoride. The dimethyl ether and boron trifluoride react readily at room temperature and at atmospheric pressure to form a heavy liquid containing approximately 1 mol of the ether to 1 mol of the halide. 308 parts by weight of the resulting product was placed in a pressure resisting autoclave into which carbon monoxide was admitted until a pressure of 900 atmospheres was obtained. The temperature was raised to and maintained between 150° C.–190° C., for 2 hours. The pressure was released, the temperature lowered to approximately room temperature and the liquid reaction product discharged into a still. The reaction mixture was then subjected to distillation during the admission of dimethyl ether directly into the liquid whereupon methyl acetate was recovered in amounts showing that 65% of the dimethyl ether had been converted to the ester.

The residue which contains approximately 1 mol of dimethyl ether and 1 mol of boron trifluoride is used for the absorption of another mol of carbon monoxide for the formation of more esters. The reaction may thus be repeated almost indefinitely particularly if the boron trifluoride and dimethyl ether lost from by-product formation or from other causes are replaced.

*Example 2.*—248 parts by weight of a product obtained by reacting equal molecular proportions of dimethyl ether and boron trifluoride, was charged into a pressure resisting reaction tube. To this charge 10% of dihydroxy fluoboric acid ($H_3BO_2F_2 \cdot BF_3$) was added. A CO pressure of approximately 800 atmospheres was superimposed, and the temperature raised and held between 150° C. to 190° C., for 2 hours. The pressure was released, the temperature lowered and the reaction product discharged having increased to 257 parts by weight. This crude product was distilled while dimethyl ether was constantly being added directly to the crude product throughout the distillation. Methyl acetate was recovered in the distillate showing a conversion of 88% of the dimethyl ether to ester.

*Example 3.*—A high pressure, silver lined autoclave was charged with 163.5 parts by weight Et$_2$O.BF$_3$ and 98.9 parts by weight HOH.BF$_3$. The autoclave in a shaker machine was heated to 170° C., under an initial CO pressure of 575 atmospheres (at room temperature). Gas absorption began to take place at 158° C. The pressure was thereafter maintained at 800 atmospheres. At the end of 29 minutes at temperature, a pressure drop of 610 atmospheres had occurred. The crude product had increased 43.6 parts by weight. Fractionation of the crude product during which diethyl ether was constantly added yielded 141.4 parts by weight of proprionic acid-boron fluoride complex, which is equivalent to 51.8% of the theoretical yield based on the ethyl ether charged. When conducting the synthesis with higher ethers the presence of water or a complex of water with boron fluoride appears to inhibit excessive by-product formation as a result of intercondensation of the products present during intermediate stages of the reaction.

The separation of the ester from the ester complex is advantageously conducted with an "upset" ratio of ether to the ester complex, i. e. more ether present than is stoichiometrically required to effect complete exchange. The "upset" ratio may be attained by continuously pumping the ether into an autoclave containing the reactants at a more rapid rate than the ether replaces the ester, the excess ether being used to sweep out the free ester. Other suitable methods of introducing an excess of the ether and continuous removal of the ester may be used.

As illustrated by the examples boron halide-water complexes may be used for catalyzing the reactions shown and from the resulting product the ester may be removed by the addition of an ether. The boron halide and water of the complex may be associated in many proportions, the higher the water concentration, however, the slower will be the reaction rate. Ratios of water to boron fluoride up to 5 to 1 have been found satisfactory with preferred ratios ranging from approximately ½ to 1 to 3 to 1 water to boron fluoride.

The amphoteric elements are herein generally referred to as suitable catalysts for the ester reaction and it will be understood that when reference is made in the appended claims to amphoteric elements boron is included thereby.

From a consideration of the above specification it will be appreciated that many changes may be made in the methods disclosed for the condensation of ethers with carbon monoxide to form esters and the subsequent removal from the reaction mixture of the esters, without departing from the invention or sacrificing any of its advantages.

I claim:

1. A process which comprises condensing an aliphatic ether with carbon monoxide in the presence of a halide of an element selected from the group consisting of the amphoteric elements and the elements which upon hydrolysis form weak bases, to give an ester under elevated pressure, adding to the reaction mixture an aliphatic ether and distilling from the resulting solution the ester formed.

2. A process which comprises condensing an aliphatic ether with carbon monoxide in the presence of a halide of an amphoteric element to give an ester under elevated pressure, adding an aliphatic ether to the resulting mixture and subsequently distilling therefrom the ester formed.

3. A process which comprises condensing an aliphatic ether with carbon monoxide in the presence of water and a halide of an element which upon hydrolysis forms a weak base, to give an ester under elevated pressure, adding to the resulting mixture an aliphatic ether and subsequently distilling therefrom the ester formed.

4. A process which comprises condensing an aliphatic ether with carbon monoxide in the presence of a boron halide and a boron halide water complex, to give an ester, adding to the reaction mixture an aliphatic ether and subsequently distilling therefrom the ester formed.

5. A process which comprises condensing an aliphatic ether with carbon monoxide in the presence of boron trifluoride, adding to the reaction mixture an aliphatic ether and subsequently distilling therefrom the ester formed.

6. A process which comprises condensing carbon monoxide with a liquid resulting from the addition of boron trifluoride to an aliphatic ether, adding to the reaction product an aliphatic ether and subsequently distilling therefrom the ester formed.

7. In a process for the preparation of methyl acetate the steps which comprise forming a compound by the addition of 0.1–1.0 mol of boron trifluoride to 1 mol of dimethyl ether, condensing carbon monoxide with the liquid thus formed, adding to the reaction product dimethyl ether and subsequently distilling from the resulting mixture the methyl acetate leaving as a residue the methyl ether and boron trifluoride.

8. A process which comprises condensing 1 mol of dimethyl ether with 1 mol of boron trifluoride, injecting carbon monoxide into the resulting liquid at a temperature between room temperature and 350° C., and a pressure of between atmospheric pressure and 1000 atmospheres, adding one mol of dimethyl ether to the reaction product, and distilling the resulting mixture to obtain methyl acetate.

9. A process for the preparation of methyl acetate which comprises condensing carbon monoxide with a dimethyl ether-boron fluoride addition compound, freeing the methyl acetate formed by adding dimethyl ether to the reaction product and distilling out the free methyl acetate.

10. In a process for the preparation of an aliphatic carboxylic acid ester by the interaction of an alkyl ether and carbon monoxide the steps which comprise condensing one mol of aliphatic ether with not appreciably more than one mol of carbon monoxide in the presence of a halide of an element selected from the group consisting of the amphoteric elements and the elements which upon hydrolysis form weak bases, adding to the reaction mixture an alkyl ether and distilling from the resulting solution the ester formed.

11. In a process for the preparation of an aliphatic carboxylic acid ester by the interaction of an alkyl ether and carbon monoxide the steps which comprise condensing one mol of aliphatic ether with not appreciably more than one mol of carbon monoxide in the presence of a halide of an element selected from the group consisting of the amphoteric elements and the elements which upon hydrolysis form weak bases under temperatures between room temperature and 350° C. and pressures between 350 and 750 atmospheres, adding to the reaction mixture an alkyl ether and distilling from the resulting solution the ester formed.

12. In a process for the preparation of an aliphatic carboxylic acid ester by the interaction of an alkyl ether and carbon monoxide the steps which comprise condensing one mol of an aliphatic ether with not appreciably more than one mol of carbon monoxide in the presence of a halide of an amphoteric element, adding an alkyl ether to the resulting mixture and subsequently distilling therefrom the ester formed.

13. In a process for the preparation of an aliphatic carboxylic acid ester by the interaction of an alkyl ether and carbon monoxide the steps which comprise condensing one mol of an aliphatic ether with not appreciably more than one mol of carbon monoxide in the presence of a halide of an element which upon hydrolysis forms a weak base, adding an alkyl ether to the resulting mixture and subsequently distilling therefrom the ester formed.

14. In a process for the preparation of an aliphatic carboxylic acid ester by the interaction of an alkyl ether and carbon monoxide the steps which comprise condensing one mol of an aliphatic ether with not appreciably more than one mol of carbon monoxide in the presence of a boron halide, adding an alkyl ether to the resulting mixture and subsequently distilling therefrom the ester formed.

15. In a process for the preparation of an aliphatic carboxylic acid ester by the interaction of an alkyl ether and carbon monoxide the steps which comprise condensing one mol of an aliphatic ether with not appreciably more than one mol of carbon monoxide in the presence of boron trifluoride, adding an alkyl ether to the resulting mixture and subsequently distilling therefrom the ester formed.

16. In a process for the preparation of ethyl propionate from diethyl ether and carbon monoxide the steps which comprise condensing one mol of diethyl ether with not appreciably more than one mol of carbon monoxide in the presence of boron trifluoride as the condensing agent, adding ethyl ether to the resulting mixture and subsequently distilling therefrom the ester formed.

17. In a process for the separation of an aliphatic organic ester from its complex with a halide of an element selected from the group consisting of the amphoteric elements and the elements which upon hydrolysis form weak bases the steps which comprise reacting the complex with an aliphatic organic ether and subsequently separating the aliphatic organic ester from the resulting mixture.

18. In a process for the separation of methyl acetate from its complex with boron fluoride the steps which comprise adding methyl ether thereto and subsequently removing from the resulting mixture the methyl acetate.

19. A process which comprises condensing an aliphatic ether with carbon monoxide in the presence of water and boron trifluoride, adding an aliphatic ether to the reaction mixture and subsequently distilling therefrom the ester formed.

20. A process which comprises reacting dimethyl ether with carbon monoxide in the presence of water and boron trifluoride, adding dimethyl ether to the reacting mixture and subsequently distilling therefrom the methyl acetate formed.

ALFRED T. LARSON.